(12) United States Patent
Clavette et al.

(10) Patent No.: US 11,933,185 B2
(45) Date of Patent: Mar. 19, 2024

(54) FUSED ROTOR

(71) Applicant: Hamilton Sundstrand Corporation, Charlotte, NC (US)

(72) Inventors: Jeremy Clavette, Farmington, CT (US); Mark R. Gurvich, Middletown, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/877,093

(22) Filed: Jul. 29, 2022

(65) Prior Publication Data
US 2024/0035394 A1   Feb. 1, 2024

(51) Int. Cl.
*F01D 21/04* (2006.01)
*B64D 13/08* (2006.01)
*F01D 5/04* (2006.01)
*F04D 29/28* (2006.01)

(52) U.S. Cl.
CPC .......... *F01D 21/045* (2013.01); *B64D 13/08* (2013.01); *F01D 5/048* (2013.01); *F04D 29/284* (2013.01); *F05B 2240/306* (2020.08)

(58) Field of Classification Search
CPC ........ F01D 5/00–066; F01D 5/34; F02C 6/12; F04D 29/22; F04D 29/2222; F04D 29/26; F04D 29/28; F04D 29/281; F04D 29/284; F04D 29/285; F04D 29/662; F05D 2240/20; F05D 2240/24; F05D 2240/241; F05D 2240/242; B64D 13/02; B64D 13/06; B64D 13/08
See application file for complete search history.

(56) References Cited

U.S. PATENT DOCUMENTS

| | | | |
|---|---|---|---|
| 3,164,370 A | | 1/1965 | Ethel |
| 3,175,804 A | | 3/1965 | Bunger |
| 3,490,748 A | | 1/1970 | Hoffman |
| 4,890,980 A | * | 1/1990 | Heald ................. F04D 29/2277 416/183 |
| 5,214,935 A | * | 6/1993 | Brunskill .............. F24F 5/0085 62/402 |

(Continued)

FOREIGN PATENT DOCUMENTS

EP          2960463 A1    12/2015
KR     20130122832 A  *  11/2013

OTHER PUBLICATIONS

European Application No. 23186147.7 filed Jul. 18, 2023; Extended European Search Report dated Jan. 4, 2024; 6 pages.

*Primary Examiner* — Christopher R Legendre
(74) *Attorney, Agent, or Firm* — CANTOR COLBURN LLP (57) ABSTRACT

A rotor includes a base member including a first side, a second side opposite the first side, and a central opening passing through the first side and the second side. The second side includes an outer circumferential edge having a first dimension and the central opening having an inner circumferential edge having a second dimension. A plurality of blades extend outwardly from the first side. The plurality of blades extend about the central opening. A fuse element is formed in the second side and extends along one of a radial direction and a circumferential direction. The fuse element has a length that is less than the first dimension.

7 Claims, 6 Drawing Sheets

(56) References Cited

U.S. PATENT DOCUMENTS

| | | | |
|---|---|---|---|
| 7,189,062 B2 * | 3/2007 | Fukizawa | F04D 25/04 |
| | | | 416/185 |
| 7,481,625 B2 * | 1/2009 | Kim | F01D 5/147 |
| | | | 416/185 |
| 2015/0226233 A1 | 8/2015 | Yagi et al. | |

* cited by examiner

FUSED ROTOR

BACKGROUND

Exemplary embodiments pertain to the art of rotating machinery and, more particularly, to a fused rotor for a rotating machine.

Rotating machines, particularly those that are designed to move air, may include a rotor that supports a number of blades. The rotor is driven to generate an airflow. In certain installations, the rotor may be fused to control a maximum functioning operating speed, i.e., the burst speed. The fuse, which may take the form of an annular notch or a groove, creates an internal stress concentration leading to a built-in failure mechanism at a certain level of load due to rotational inertia. At a certain operating speed or speed range, the stress concentrations in the rotor will generate a fracture at the fuse. Without the built-in failure mechanism, the structure surrounding the rotor would need to be much heavier and potentially more expensive since the size and material properties of the surrounding structure would need to contain the rotor at higher operating speeds.

The ability of such fuses to generate the fracture with a desired accuracy for a specified speed can be still a challenge. Conventional fuses have relatively simple shapes (e.g., full 360 deg circumferential groove) and therefore lack the desired accuracy to react to specified burst speeds. Therefore, advanced designs of fused rotors with capabilities of enhanced sensitivity of the fracture event to the rotational speed can be an important improvement for such components (rotors) with respect to both performance under service and weight/cost reduction.

BRIEF DESCRIPTION

A rotor in accordance with a non-limiting example, includes a base member including a first side, a second side opposite the first side, and a central opening passing through the first side and the second side. The second side includes an outer circumferential edge having a first dimension and the central opening having an inner circumferential edge having a second dimension. A plurality of blades extend outwardly from the first side. The plurality of blades extend about the central opening. A fuse element is formed in the second side and extends along one of a radial direction and a circumferential direction. The fuse element has a length that is less than the first dimension.

Additionally, or alternatively, in this or other non-limiting examples, the fuse element includes a first end positioned at the inner circumferential edge, a second end positioned at the outer circumferential edge, and an intermediate portion.

Additionally, or alternatively, in this or other non-limiting examples, the intermediate portion is linear.

Additionally, or alternatively, in this or other non-limiting examples, the intermediate portion extends along a radius of the second side.

Additionally, or alternatively, in this or other non-limiting examples, the intermediate portion extends at an angle relative to a radius of the second side.

Additionally, or alternatively, in this or other non-limiting examples, the intermediate portion is curvilinear.

Additionally, or alternatively, in this or other non-limiting examples, the fuse element includes a first end positioned at the inner circumferential edge and a second end that is spaced from the outer circumferential edge.

Additionally, or alternatively, in this or other non-limiting examples, the fuse element includes a first end spaced from the inner circumferential edge and a second end that extends to the outer circumferential edge.

Additionally, or alternatively, in this or other non-limiting examples, the fuse element includes a first end spaced from the inner circumferential edge, a second end that is spaced from the outer circumferential edge.

Additionally, or alternatively, in this or other non-limiting examples, the fuse element includes a first fuse element and a second fuse element extending along a radius of the second side.

Additionally, or alternatively, in this or other non-limiting examples, each of the first fuse element and the second fuse element is spaced from the inner circumferential edge and the outer circumferential edge.

Additionally, or alternatively, in this or other non-limiting examples, the first fuse element is spaced from the second fuse element.

Additionally, or alternatively, in this or other non-limiting examples, the first fuse element and the second fuse element are co-linear.

Additionally, or alternatively, in this or other non-limiting examples, the fuse element includes a first end, a second end, and a curvilinear intermediate portion, the fuse element extending along a circumference of the second side between the inner circumferential edge and the outer circumferential edge.

Additionally, or alternatively, in this or other non-limiting examples, the first end is spaced from the inner circumferential edge a first distance in a radial direction and the second end is spaced from the inner circumferential edge a second distance in the radial direction, the second distance being equal to the first distance.

Additionally, or alternatively, in this or other non-limiting examples the first end is spaced from the inner circumferential edge a first distance in a radial direction and the second end is spaced from the inner circumferential edge a second distance in the radial direction, the second distance being greater than the first distance.

Additionally, or alternatively, in this or other non-limiting examples, the fuse element includes a first fuse element extending along a radius of the second side and a second fuse element extending along a circumference of the second side.

An aircraft, in accordance with non-limiting examples, includes a fuselage defining a cockpit and a passenger cabin and an air conditioning unit configured to direct conditioned air into one of the cockpit and the passenger cabin. The air conditioning unit includes a rotor having a base member including a first side, a second side opposite the first side, and a central opening passing through the first side and the second side. The second side includes an outer circumferential edge having a first dimension and the central opening has an inner circumferential edge having a second dimension. A plurality of fins extend outwardly from the first side. The plurality of fins extend about the central opening. A fuse element is formed the second side and extends in one of a radial direction and a circumferential direction. The fuse element has a length that is less than the second dimension.

Additionally, or alternatively, in this or other non-limiting examples, the fuse element includes a first end positioned at the inner circumferential edge, a second end positioned at the outer circumferential edge, and an intermediate portion.

Additionally, or alternatively, in this or other non-limiting examples, the fuse element includes a first end, a second end, and a curvilinear intermediate portion, the fuse element extending along a circumference of the second side between the inner circumferential edge and the outer circumferential edge.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
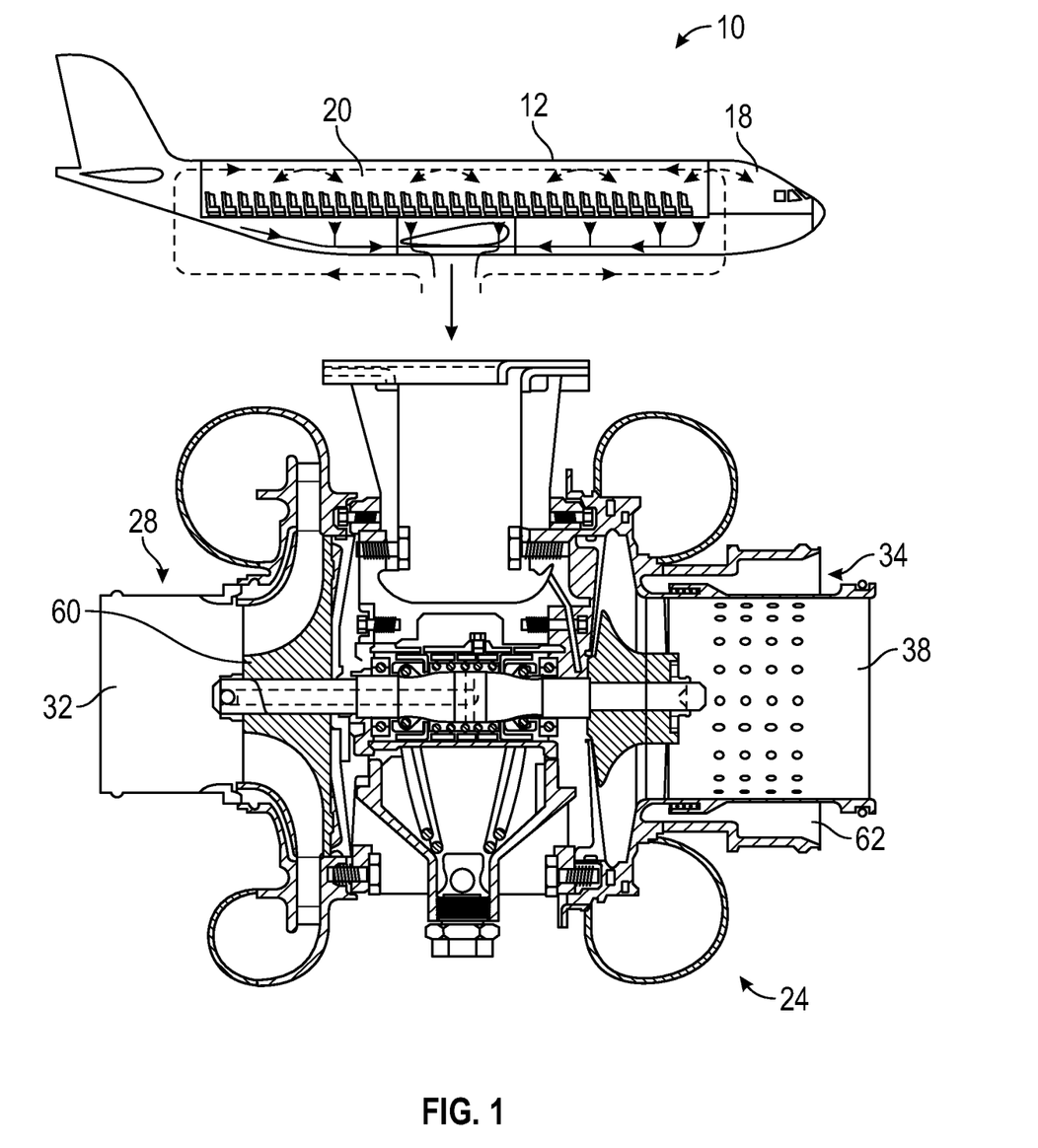
FIG. 1 depicts cross-sectional side views of an aircraft including a simple air cycle machine as a part of an air conditioning unit having a rotor including a fuse element, in accordance with a non-limiting example.

An aircraft in accordance with a non-limiting example is indicated generally at 10 in FIG. 1. Aircraft 10 includes a fuselage 12 that defines, in part, a cockpit 18 and a passenger cabin 20. An air cycle machine 24 is supported by fuselage 12 and operable to deliver conditioned air into cockpit 18 and/or passenger cabin 20. Air cycle machine 24 includes a compressor portion 28 including a compressor inlet 32 and a turbine portion 34 including a turbine outlet 38. Compressor portion 28 includes a compressor rotor 60 and turbine portion 34 includes a turbine rotor 62. At this point, it should be understood that air cycle machine 24 may take on a variety of forms including air conditioning units, air moving units, and the like.

Figure 2A:
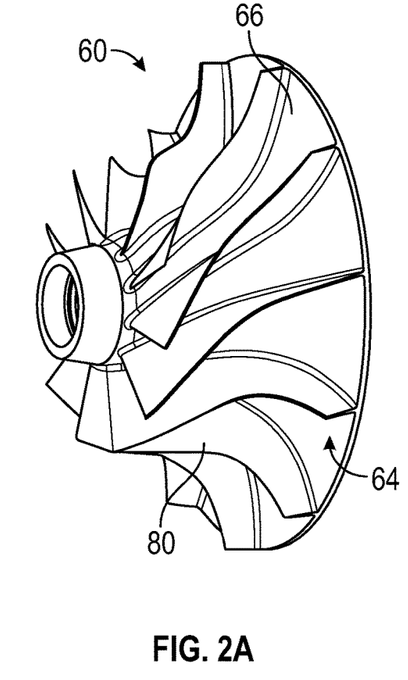
FIG. 2A is a front perspective view of a rotor including a fuse element, in accordance with a non-limiting example.
Figure 2B:
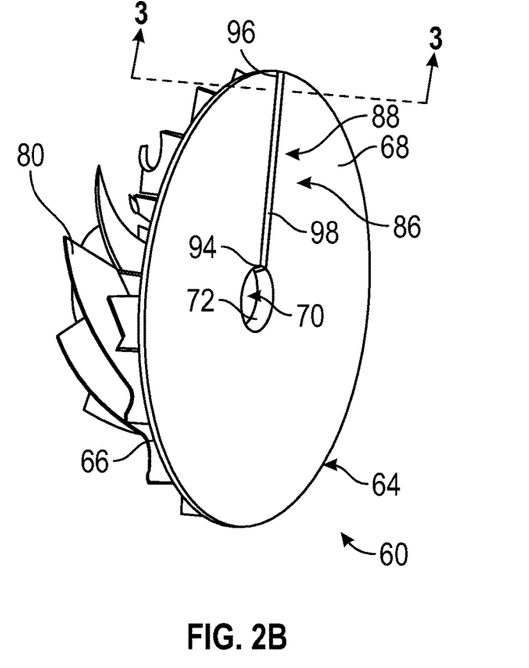
FIG. 2B is a rear perspective view of the rotor of FIG. 2A including a fuse element, in accordance with a non-limiting example.
Figure 3:
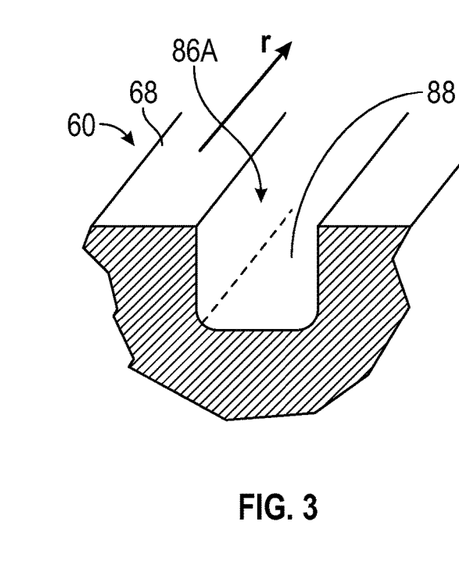
FIG. 3 is a partial cross-section view of the rotor of FIG. 2B taken along the line 3-3, in accordance with a non-limiting example.

Compressor rotor 60 is rotated to draw in a supply of air to compressor inlet 32. The supply of air is conditioned or passed through a heat exchanger (not shown) and delivered through turbine outlet 38 into cockpit 18 and/or passenger cabin 20. Turbine rotor 62 provides a motive force to the airflow passing from turbine outlet 38. Reference will follow to FIGS. 2A and 2B and 3 in describing compressor rotor 60 in accordance with a non-limiting example. It should be understood that turbine rotor 62 may include similar structure.

FIGS. 2A and 2B show front and rear perspective views of a fused rotor. As shown in FIG. 2A, compressor rotor 60 includes a base member 64 having a first side 66 and a second side 68 (FIG. 2B) defining a circumferential surface (not separately labeled). Second side 68 is opposite to first side 66. Base member 64 includes a central opening 70 defining an inner circumferential edge 72. Base member 64 also include an outer circumferential edge 76. A plurality of blades 80 are provided on first side 66 about central opening 70. As compressor rotor 60 spins, fins 80 develop an airflow that is channeled to select portions of, for example, an aircraft.

In a non-limiting example, compressor rotor 60 includes a fuse element 86 which takes the form of a groove 88 formed in second side 66 as shown in FIG. 3. Fuse element 86 should be understood to define a built-in failure mechanism for compressor rotor 60. That is, fuse element 86 will cause a crack to propagate through base member 64 under selected operating conditions leading to a failure of compressor rotor 60. In a non-limiting example, fuse element 86 is designed to cause a failure if compressor rotor 60 experiences speeds above a selected value. In this manner, compressor rotor 60 is not operated above a selected design speed. Failure above the design speed may not only lead to rotor damage but also to lead to damage of surrounding structure and thus create a need for a more robust housing to contain any rotor fragments. Rotor failure can also lead to damage of surrounding components and, thus, create a need for more robust structure in order to contain any rotor fragments.

Referring to FIG. 2B, in a non-limiting example, fuse element 86 includes a first end 94 arranged at inner circumferential edge 72, a second end 96 arranged at outer circumferential edge 74 and an intermediate portion 98. Intermediate portion 98 extends along a radius of base member 64. Fuse element 86 is designed to cause a failure of compressor rotor 60 when exposed to hoop stresses, or stresses perceived about a circumference of base member 64 above a selected level. The selected level corresponds to hoop stresses generated at or above a selected rotational speed of compressor rotor 60. The particular shape, geometry, and dimensions of groove 88 may vary in different rotor designs and can be optimized according to specifics of particular applications. Similarly, cross-sectional shapes and geometries of fuse groove can be either uniform or non-uniform along their length.

Figure 4:
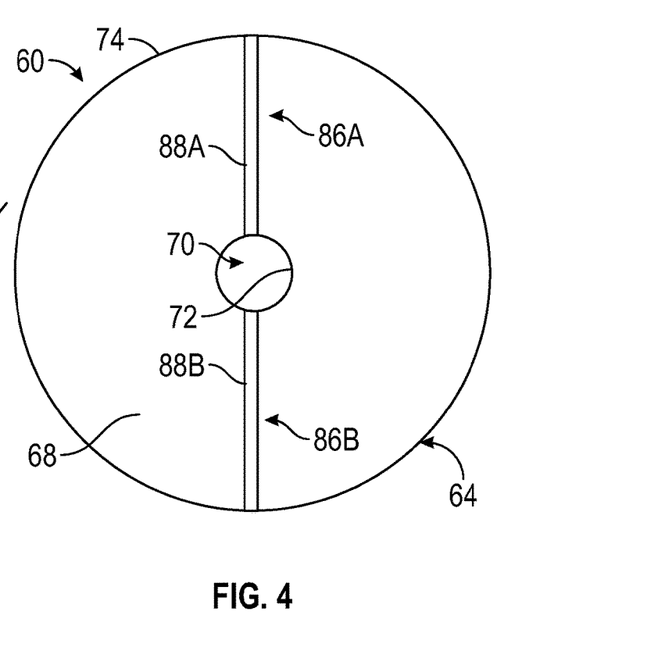
FIG. 4 is a rear side view of a rotor including first and second fuse elements, in accordance with a non-limiting example.

For example, as shown in FIG. 4, base member 64 may include a first fuse element 86A and a second fuse element 86B. Fuse elements 86A and 86B take the form of first and second grooves 88A and 88B that are aligned with one another and extend across a radius of base member 64. Fuse elements 86A and 86B may also be arranged at an angle relative to one another.

Figure 5:
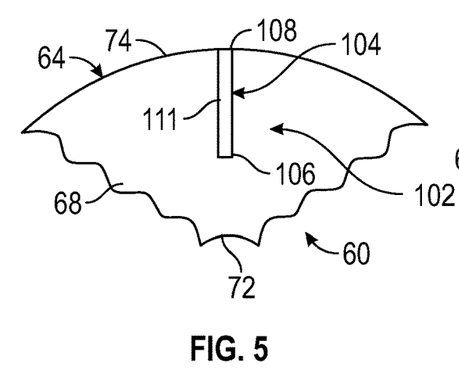
FIG. 5 is a rear side view of a rotor surface including a fuse element, in accordance with a non-limiting example.
Figure 6:
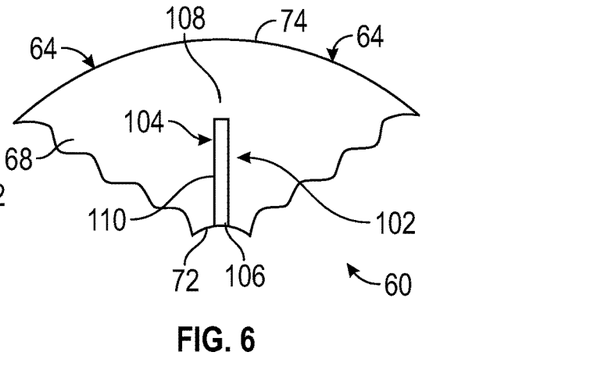
FIG. 6 is a rear side view of a rotor surface including a fuse element, in accordance with a non-limiting example.
Figure 7:
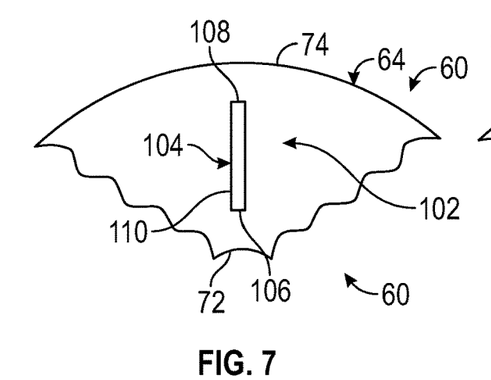
FIG. 7 is a rear side view of a rotor surface including a fuse element, in accordance with a non-limiting example.
Figure 8:
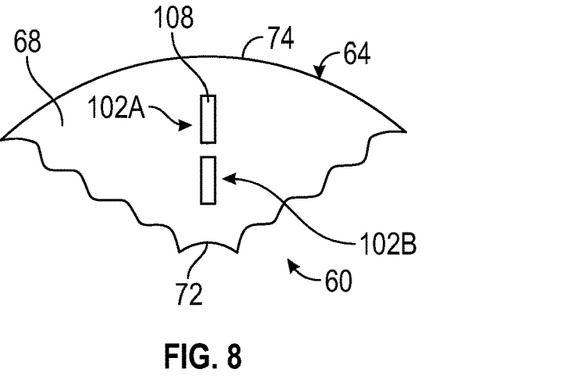
FIG. 8 is a rear side view of a rotor surface including a first fuse element and a second fuse element, in accordance with a non-limiting example.

Referring to FIG. 5, a fuse element 102 defined by a groove 104 in accordance with a non-limiting example includes a first end 106 that is spaced from inner circumferential edge 72, a second end 108 that terminates at outer circumferential edge 74 and an intermediate portion 110 that extends along a portion of a radius of base member 64. In FIG. 6, first end 106 of fuse element 102 is arranged at inner circumferential edge 72 and second end 108 is spaced from outer circumferential edge 74. In FIG. 7, first end 106 of fuse element 102 is spaced from inner circumferential edge 72 and second end 104 is spaced from outer circumferential edge 74. FIG. 8 depicts a first fuse element 102A and a second fuse element 102B extending along a common radius of base member 64. In other non-limiting example, more than two similar fuse elements can be similarly arranged along a common radius. The particular orientation and arrangement of fuse element (s) 102 can vary in order to accommodate a specific failure speed.

Figure 9:
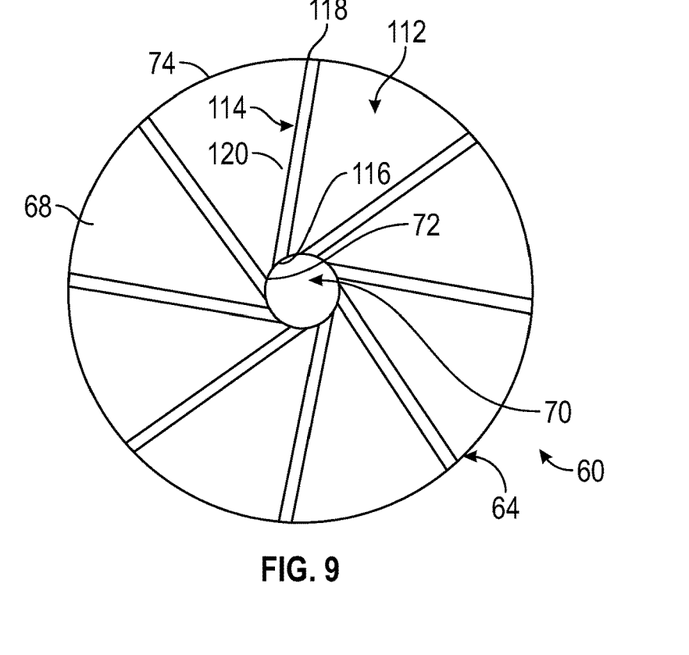
FIG. 9 is a rear side view of a rotor including fuse elements, in accordance with a non-limiting example.
Figures 10, 11, 12:
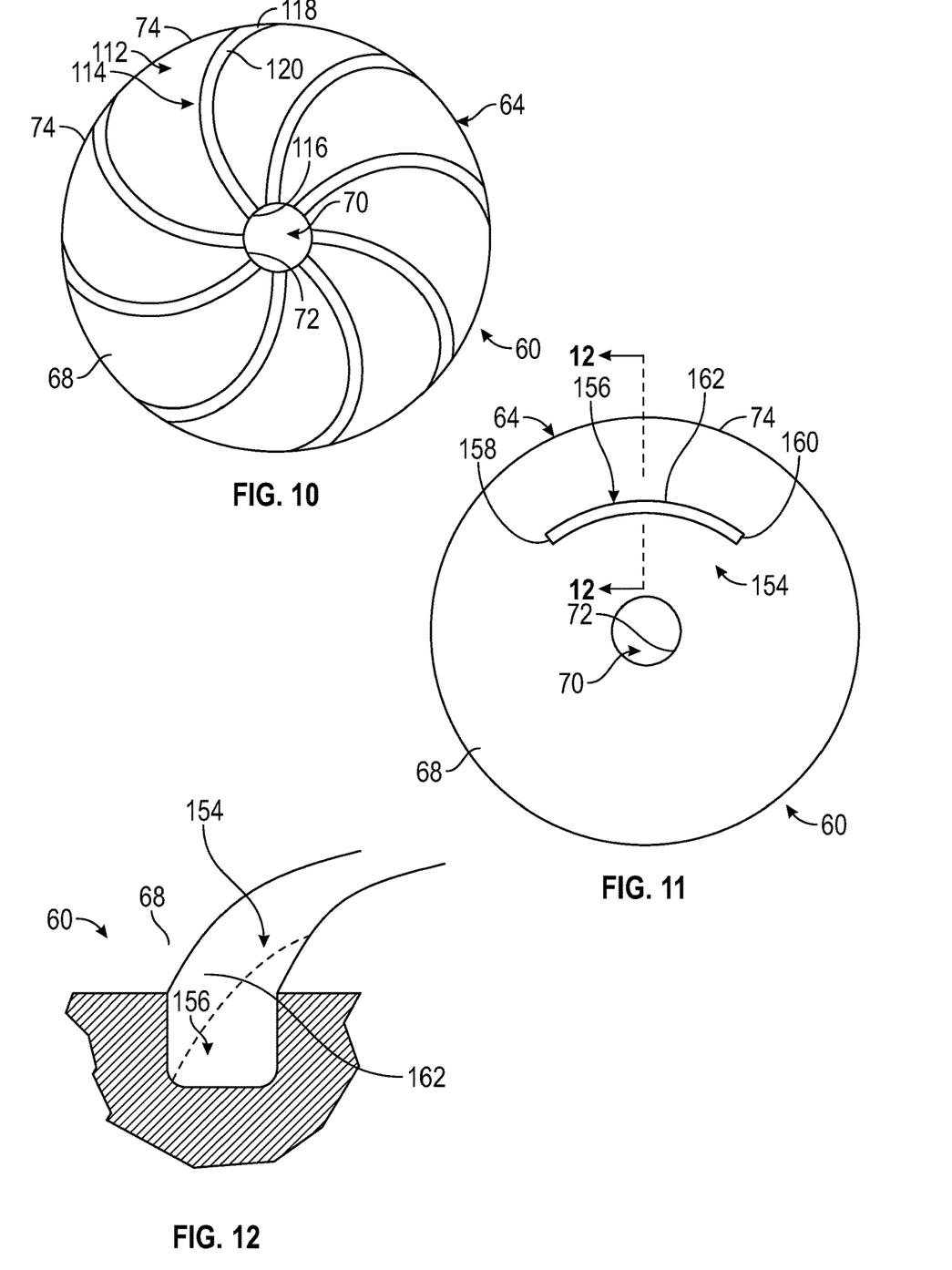
FIG. 10 is a rear side view of a rotor including fuse elements, in accordance with a non-limiting example.
FIG. 11 is a rear side view of a rotor including a fuse element, in accordance with a non-limiting example.
FIG. 12 is a partial cross-sectional view of the rotor of FIG. 11 taken along the line 12-12, in accordance with a non-limiting example.

In a non-limiting example shown in FIG. 9, a plurality of fuse element 112 shown in the form of grooves 114 are arrayed about second side 66. Each fuse element 112 includes a first end 116 arranged at inner circumferential edge 72, a second end 118 arranged at outer circumferential edge 74, and an intermediate portion 120. In a non-limiting example, intermediate portion 120 is substantially linear and extends at an angle relative to a radius of base member 64. In FIG. 10, intermediate portion 120 is shown to be curvilinear.

In FIGS. 11 and 12, a fuse element 154 is shown to extend about a portion of a circumference of second side 68. Fuse element 154 takes the form of a curvilinear groove 156 (FIG. 12). that includes a first end 158, a second end 160, and an intermediate portion 162 that is shown to define curvilinear. The particular orientation and geometry of intermediate portion 162 may be varied in order to respond or fail when subjected to hoop and/or radial forces on compressor rotor 60 at a selected speed(s). Fuse element 154 is designed to fail of promulgate a crack when exposed to selected radial forces on compressor rotor 60. In a non-limiting example, first end 158 and second end 160 are equally spaced from inner circumferential edge 72.

Figures 13, 14, 15:
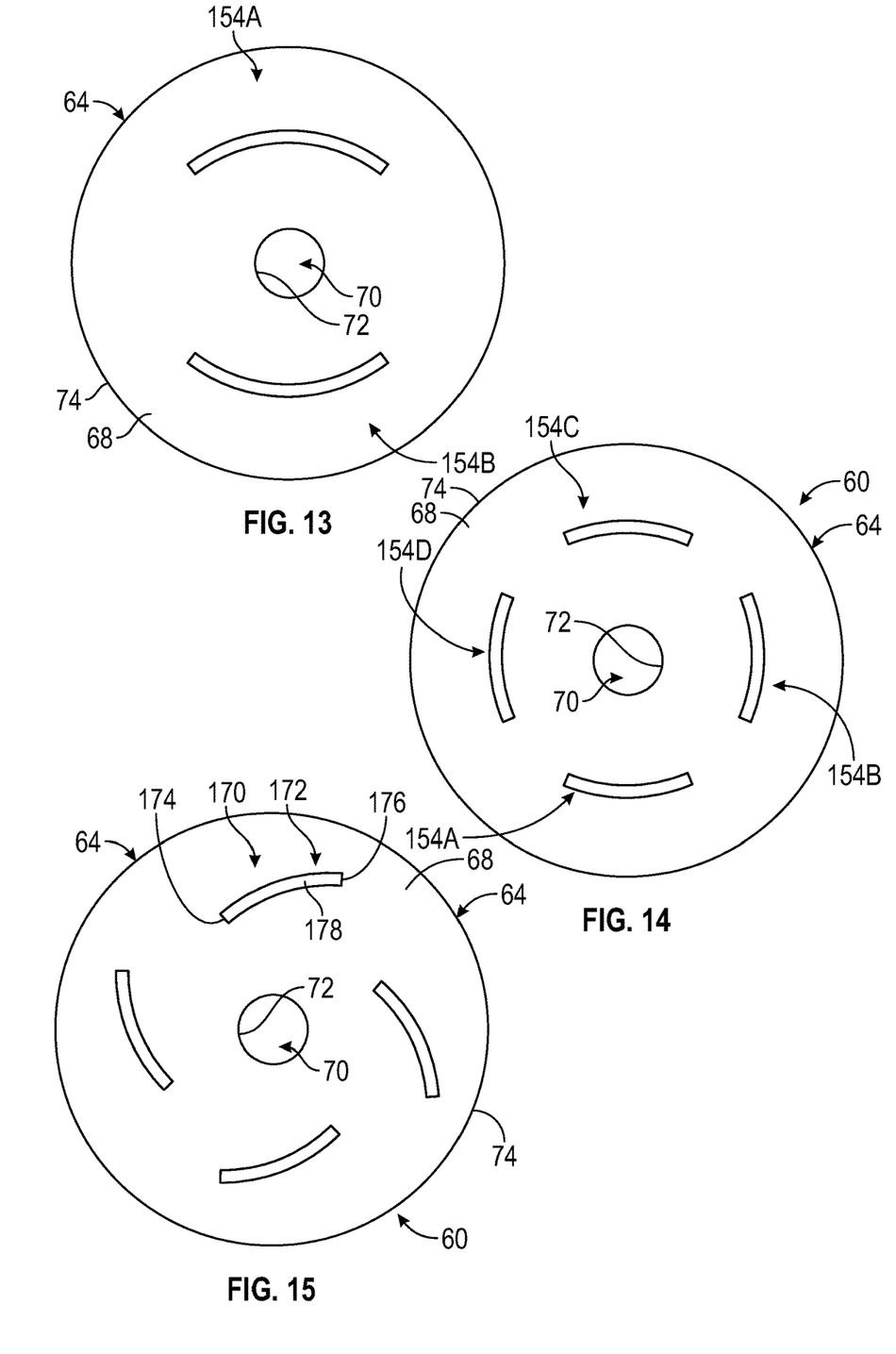
FIG. 13 is a rear side view of a rotor including fuse elements, in accordance with a non-limiting example.
FIG. 14 is a rear side view of a rotor including fuse elements, in accordance with a non-limiting example.
FIG. 15 is a rear side view of a rotor including fuse elements, in accordance with a non-limiting example.

In a non-limiting example shown in FIG. 13, a first fuse element 154A and a second fuse element 154B are formed in base member 64 and arranged opposite to one another. In FIG. 14, a first fuse element 154A, a second fuse element 154B, a third fuse element 154C and a fourth fuse element 154D are formed in base member 64 and circumferentially spaced one from another.

FIG. 15 depicts a plurality of fuse member 170 arranged about second side 66 in accordance with another non-limiting example. Each fuse member 170 is defined by a groove 172 having a first end 174, a second end 175, and an intermediate portion 178. In a non-limiting example, intermediate portion 178 is curvilinear. It should however be understood that intermediate portion 178 may be linear. In a non-limiting example, first end 174 is spaced from inner circumferential edge 72 a first distance and second end 176 is spaced from inner circumferential edge 72 a second distance that is greater than the first distance.

Figure 16:
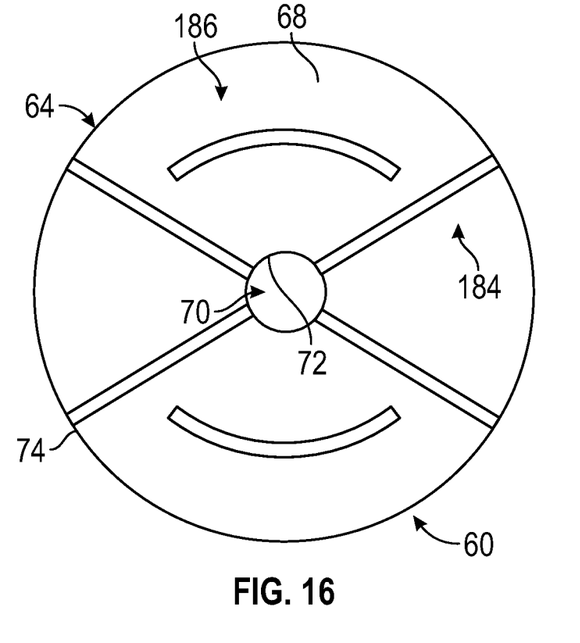
FIG. 16 is a rear side view of a rotor including first fuse elements and second fuse elements, in accordance with a non-limiting example.

FIG. 16 depicts a hybrid failure mode. That is, a first plurality of fuse elements 184 extend along a radius of base member 64 and a second plurality of fuse elements 186 extend along a portion of a circumference of base member 64 in accordance with a non-limiting example. Fuse elements 184 are designed to fail when subjected to hoop forces that exceed a selected magnitude and fuse elements 186 are designed to fail when subjected to radial forces of a selected magnitude. The non-limiting examples disclosed herein depict various fuse element arrangements that are designed to respond to select forces on a rotor so as to create a selected operating speed ceiling that that establishes design criteria for surrounding components. It should be understood that while described in terms of a compressor rotor, the non-limiting examples may be utilized in a wide array of systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure shall not be limited to the particular embodiment disclosed as the best mode contemplated for carrying out this present disclosure, but that the present disclosure will include all embodiments falling within the scope of the claims.

What is claimed is:

1. A rotor comprising:
  a base member including a first side, a second side opposite the first side, and a central opening passing through the first side and the second side, the second side including an outer circumferential edge defined by a first dimension of the base member and the central opening having an inner circumferential edge defined by a second dimension;
  a plurality of blades extending outwardly from the first side, the plurality of blades extending about the central opening; and
  a fuse element formed in the second side and extending along one of a radial direction and a circumferential direction, the fuse element forming a built-in failure mechanism including a uniform cross-section and having a length that is less than the first dimension, the fuse element causing a crack to propagate across the base member when the rotor is operated above a selected design speed, wherein the fuse element includes a first end positioned at the inner circumferential edge, a second end positioned at the outer circumferential edge, and an intermediate portion.

2. The rotor according to claim 1, wherein the intermediate portion is linear.

3. The rotor according to claim 2, wherein the intermediate portion extends along a radius of the second side.

4. The rotor according to claim 2, wherein the intermediate portion extends at an angle relative to a radius of the second side.

5. The rotor according to claim 1, wherein the intermediate portion is curvilinear.

6. A rotor comprising:
a base member including a first side, a second side opposite the first side, and a central opening passing through the first side and the second side, the second side including an outer circumferential edge having a first dimension and the central opening having an inner circumferential edge having a second dimension;
a plurality of blades extending outwardly from the first side, the plurality of blades extending about the central opening; and
a fuse element formed in the second side and extending along one of a radial direction and a circumferential direction, the fuse element forming a built-in failure mechanism including a uniform cross-section and having a length that is less than the first dimension, the fuse element causing a crack to propagate across the base member when the rotor is operated above a selected design speed, wherein the fuse element includes a first end positioned at the inner circumferential edge and a second end that is spaced from the outer circumferential edge.

7. An aircraft comprising:
a fuselage defining a cockpit and a passenger cabin;
an air conditioning unit configured to direct conditioned air into one of the cockpit and the passenger cabin, the air conditioning unit including a rotor comprising:
a base member including a first side, a second side opposite the first side, and a central opening passing through the first side and the second side, the second side including an outer circumferential edge defined by a first dimension of the base member and the central opening having an inner circumferential edge defined by a second dimension;
a plurality of fins extending outwardly from the first side, the plurality of fins extending about the central opening; and
a fuse element formed in the second side and extending along one of a radial direction and a circumferential direction, the fuse element forming a built-in failure mechanism including a uniform cross-section and having a length that is less than the first dimension, the fuse element causing a crack to propagate across the base member when the rotor is operated above a selected design speed, wherein the fuse element includes a first end positioned at the inner circumferential edge, a second end positioned at the outer circumferential edge, and an intermediate portion.

* * * * *